Aug. 30, 1949.    J. H. S. SKONING    2,480,426
METHOD OF MAKING PRECISION MOLDS
Filed April 27, 1943
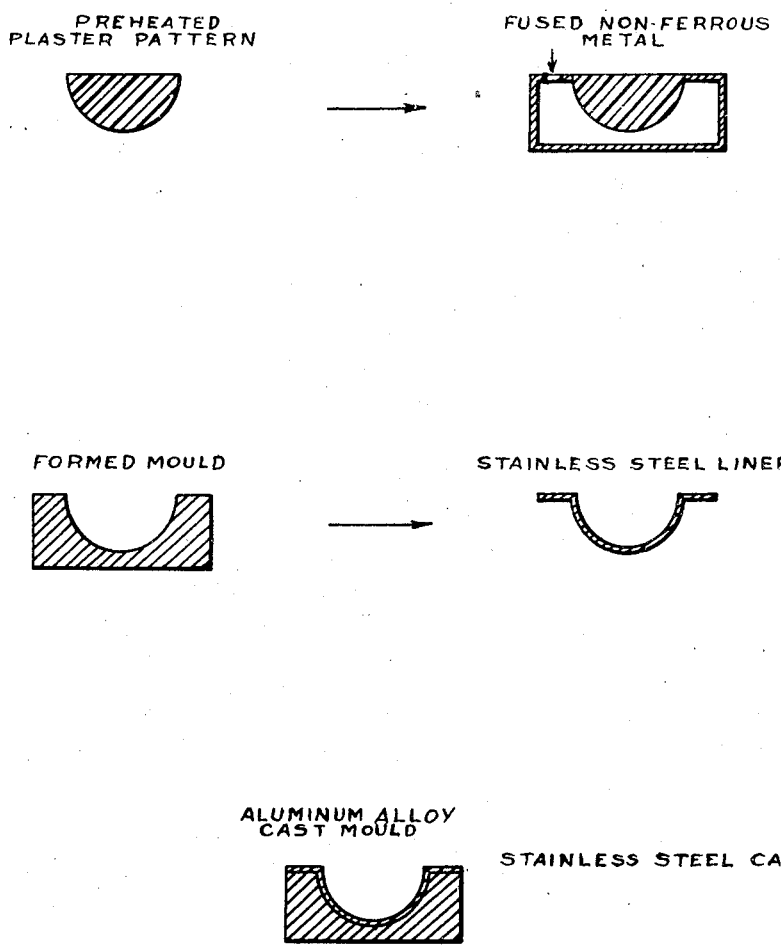
INVENTOR.
JOHN H. S. SKONING
BY
Raymond J. Norton Patented Aug. 30, 1949

2,480,426

UNITED STATES PATENT OFFICE 2,480,426

METHOD OF MAKING PRECISION MOLDS

John H. S. Skoning, Grosse Pointe Park, Mich.

Application April 27, 1943, Serial No. 484,781

9 Claims. (Cl. 29—148.2)

This invention relates to an improved process of producing molds for resinous materials.

The present application is a continuation in part of prior application, Serial No. 344,976, filed July 11, 1940, now Patent 2,336,578.

As is known, the mold is one of the most expensive items in the production of cast thermoplastic and thermo-setting resins. One of the most important factors in the production of good plastic molded products is a carefully designed and properly constructed mold. In order to insure an accurate shape and the desirable high surface finish to the cast resin the mold must be carefully machined and polished.

In the past, hardened steel and stainless steels have largely been employed for producing the mold. These materials present a high initial expense but they are preferred over cheaper material because of lower maintenance cost and longer ultimate life. The great expense entailed in the production of a mold is inherent in the method of its production. In the typical case this involves starting from a solid block of steel which is shaped to its final form by a series of separate expensive steps. In most cases a relatively soft steel is employed and after forming the mold by conventional machining or hobbing it is heat treated, usually by case hardening or oil quenching to give the desired wear resistance. Since the formed molds are quite massive and are of uneven shape shrinking or warping may occur during the hardening step. Where the mold is rather complicated in design special non-shrinking oil hardenable steels are required.

The present invention comprises a new technique in the production of molds as a result of which new and improved molds are produced. As will be seen, the new procedure combines the major advantages of low initial cost of the metal of the mold coupled with ideal physical and chemical characteristics of the molding surface. As will be seen more fully hereinafter the novel process requires but a minimum of expensive mold surfacing materials and insures the rapid and economical production of molds of any size which assure close tolerances and optimum surface finish of the molded plastic. Another salient advantage of the invention is the ease of duplicating the mold.

In the accompanying drawings there is shown in flow sheet form, the steps involved in production according to the invention.

Under the concept of the invention the improved mold comprises a composite structure made up of a readily formable massive base associated with a liner of a different material which forms the molding or resin-contact surface. The method of producing the mold differentiates equally from the typical machining and hobbing operations. In carrying out the invention a special metal is utilized for the structure of the mold. This is preferably an aluminum base alloy which is readily cast to close tolerances and presents excellent physical properties. In the operation of producing the mold the alloy is directly cast in contact with a suitable refractory pattern to thus immediately and directly form the contours of the mold shape. Thereafter the mold surface is applied to the cast base. Such surface comprises a relatively thin liner of a metal having the desirable characteristics of a mold surface, such for example, as a deep draw stainless steel. This assemblage is simply effected by resiliently forcing or pressing the liner into the preformed casting. Such resilient pressing coupled with the use of thin stock for the liner insures an exact conformation of the liner to the cast mold surface which is itself an accurate counterpart of the original pattern.

A further advantage of the new technique, which is of salient importance, is that it permits the casting, in situ, of ducts or cores for heating and cooling the mold.

A further advantage of the new procedure, as will be seen subsequently, is that it insures a rapid and economical reproduction of the liner or mold contact surface thus permitting the utilization of the most desirable material for a given resin or for given molding conditions.

The manifold technical advantages of the new procedure as well as the marked economies of production, as compared to prior practice, will be more readily appreciated from a consideration of the specific steps in the production of a mold.

As will have been observed, a major concept of the invention is the direct casting of a molten metal to form, in situ, the contour of the mold cavity and the subsequent association, with this preform, of a conformed liner of a material of the optimum characteristics for the resin-contacting surface. In this manner economical casting technique supplants the expensive machining or hobbing operations of the past and avoids the difficulties of special quenching, case hardening and the like, which were the concomitants of the earlier procedures.

In carrying out the invention a pattern of the mold is made up. Such pattern may be formed of wood or any other suitable material which is formed to complicated shapes with good definition.

The pattern thus formed is then coated with a suitable separator material of the type of dental separators, such for example, as "Kerr Super-Sep" or "Kerr Rapid Model Glaz." These or any material which insures ready separation of the pattern from a plastic cast may be utilized. Thereafter a plaster cast is made up of the pattern. Any suitable refractory material generally employed may be used for this purpose. Excellent results have been obtained employing a dental plaster of the gypsum type such as "Kerr Smooth Cast."

The plaster cast is separated from the pattern and is then suitably placed in a cope box. In the cope box suitable cores are mounted. These cores may consist of copper or steel tubing bent to the desired shape and which serve as heat transfer ducts in the final mold. The cope box is then placed in an oven, such for example, as a high temperature tunnel type oven and the plaster cast is heated to a temperature of the order of 800° F. for a period of time sufficiently prolonged to dehydrate the cast.

The next operations consist in directly casting the mold in contact with the plaster mold surface and the described cores. It has been ascertained that a particularly effective casting material for this purpose is "Kirksite A." This is a non-ferrous alloy having good casting characteristics and having a high tensile strength and excellent impact resistance in "as cast" condition. Such alloy consists of the following approximate composition: Al 60%; Zn 20%; Cu 13%; Bi (balance). This product provides an excellent material for the mold body having a tensile strength of the order of 60,000 lbs. per sq. in., and good physical and thermal shock resistance. It will be understood that while an alloy of the general type described is preferred any other alloy having comparable characteristics may be employed.

While the plaster cast is maintained in the oven and at the stated elevated temperatures the melted alloy, preferably raised to the same temperature, i. e., of the order of 800° F. is poured into the mold through an oven wall spew. In these circumstances the highly fluid metal intimately contacts the plastic surfaces and the exterior surfaces of the assembled cores forming with the latter an adherent bond or weld. The cast metal is retained in the oven and allowed to cool therein. This measurably improves the grain structure of the cast alloy with concomitant improvement in the physicals for this slow cooling functions to a degree as a soaking operation. As the temperature drops in the furnace the molten metal progressively freezes and some shrinkage takes place, generally toward the center of the mass. This shrinkage may be compensated for by filling in with a welding rod of the same composition which is melted with an acetylene torch.

When the cast material is cooled it is removed from the plaster cast, file finished and the bottom of the mold or poured surface is planed off making it parallel with the working surface of the mold. The unit thus produced, as will be appreciated, comprises a substantially unitary structure having the thermal ducts cast as inserts in the mold and provided with mold cavities or contours of the precise definition of the pattern.

As intimated above, the advantages of such a simple mold fabrication are coupled with the further advantage of an actual molding surface of optimum characteristics. This is secured by providing a liner of different material, such as a thin gauge stainless steel, which is conformed to exact registry with the mold cavities by simple pressing.

In a typical case a liner of deep draw stainless steel of the 18 Cr 8 Ni type is employed. This desirably may be of thin stock because all essential stresses are taken by the Kirksite mold. Usually the liner material is between about .020 and .060 inch in thickness. A sheet of the liner material is cut to size and then is resiliently pressed down into the cavity of the mold. Preferably this is accomplished by hydro-rubber pressing. In lieu of this, other equivalent methods which insure the desired deformation without scarification of the molding surface of the liner may be employed. For example, certain synthetic resins may be used for the pressing member by simply casting a punch of a resin like "Plastalloy" into the Kirksite mold and then using this as the male die for forming the liner. With either hydro-rubber or plastic it will be appreciated that metal to metal contact on the working surface of the liner is avoided and danger of scratching or cutting such surface is eliminated. With this type of pressing the original surface polish of the sheet of the liner stock may be preserved.

When the mold cavity is rather deep the pressing may be conducted in stages with suitable intermediate anneals so as to relieve the work-hardened metal. After the liner is pressed into contact with the mold surface it may be given a final anneal to relieve stresses and if desired, may be given a hydrogen anneal to brighten the surface. Where submacroscopically smooth surfaces are desired on the molding surfaces the pressed liner may be given an electrolytic polish by treatment in a suitable electrolyte.

After the liner is completely conformed to the contours of the mold whether with a single pressing or with multiple pressings with intermediate stress-relieving anneals it is removed. The cavity of the Kirksite mold is then coated with a material, such as vinyl chloride, and the liner is pressed again into the mold. Such pressing expels or extrudes excess of the resin and the thin film of resin functions as an adhesive between the cast mold and the pressed liner. Although the adhesive is an organic material and although the mold is heated during use it is found that the cementing action is retained for a long period of time. The application of the resin followed by pressing of the absolutely conformed surfaces tends also to form a seal of the resin at the edges of the liner.

It will be appreciated from the foregoing description that the male section of force of the mold may be made employing similar steps. In making the force, liner and work clearance is provided for by a wax sheet of proper thickness over the original pattern.

In lieu of the wax sheet other sheeted plastic material such as "Plasteralloy" may be employed as a coating for the original pattern. In this procedure a plaster cast may be made of the coated original pattern and then a second negative plaster cast may be made from it so as to produce the inverse of the original pattern. This second plaster cast may then be dehydrated and used as the molding surface for the molten Kirksite in the manner described.

A second method which may be employed comprises utilizing the second plaster cast described above directly as a pattern for the liner material. In this method the liner is pressed onto the ceramic mold. The liner and plaster cast are placed in a cope box, put in the oven, brought up to a temperature of about 800° F. and the molten Kirksite poured around the preformed liner. After cooling in the oven the plaster cast is removed leaving the composite liner-Kirksite force.

The formed force and mold are then registered and dowelled in their proper registry position.

It will be observed that with the improved type of procedure the problem of duplicating the actual working surfaces of the mold or force is extremely simple. It is necessary only to remove the existing liner and hydro-rubber press a sheet of liner material into the cavity of the mold or force. If desired this operation may be repeated several times when the mold units are first made up so that a stock of liners may be kept on hand. No substantial limitations are placed on the size of the molds. Under existing practice the size of a mold which may be used is limited not only by the size of available steel billets but also by the means for machining such large work. Under the present invention the only limitation placed on mold size is that inherent in casting technique. For larger molds the liner material may be pressed in sections and then soldered or otherwise joined together to give an integral liner of any given size.

It will thus be appreciated that the present invention presents many advantages. By utilizing the principles of the invention a mold of optimum characteristics may be produced most economically and may be maintained or serviced at a minimum cost. The method practically entirely eliminates the machining operations heretofore found necessary for forming the mold and the thermal cores or ducts. The mold of the invention is fabricated by true plastic methods rather than machining methods by solidifying a fused metal in contact with a cast and pressure forming a liner of uniform cross section into the desired mold cavity contour.

While improved embodiments of the invention have been described it is to be understood that these are given to illustrate the underlying principles involved and not as limiting the invention to the particular embodiments chosen for illustration.

I claim:

1. The method of making precision molds for casting resinous bodies which comprises, casting an aluminous alloy consisting essentially of approximately 60% of aluminum, 20% of zinc, 13% of copper, and 7% of bismuth in contact with a preheated refractory plaster cast, and subsequently cold deforming a ductile alloy steel liner into uniform contact with the mold cavity of the mold.

2. A method of producing molds for casting resinous materials which comprises, casting a mlod body by contacting a preheated refractory pattern with a fused metal, freezing the metal and removing the pattern, and resiliently pressing a thin sheet of a ductile alloy steel into intimate contact with the mold cavity to form the resin contacting mold surface and permanently associating the sheet of alloy steel with the mold to form the molding surface thereof.

3. A method of producing molds for casting resinous materials which comprises, casting a mold of an aluminous alloy consisting essentially of approximately 60% of aluminum, 20% of zinc, 13% of copper, and 7% of bismuth and rubber-hydro-pressing a thin stainless steel liner into the mold cavity.

4. The method of making precision molds for casting resinous bodies which comprises, casting an aluminous alloy consisting essentially of approximately 60% of aluminum, 20% of zinc, 13% of copper, and 7% of bismuth in contact with a refractory cast which cast is preheated to substantially the temperature of the molten alloy and subsequently cold deforming a ductile alloy steel liner into uniform contact with the mold cavity.

5. The method of making precision molds for casting resinous bodies which comprises, forming a refractory cast of a mold pattern, heating the cast to a temperature of the order of 800° F. in a suitable oven, pouring a molten aluminous alloy consisting essentially of approximately 60% of aluminum, 20% of zinc, 13% of copper, and 7% of bismuth at substantially 800° F. in contact with the cast, cooling the casting in the oven, removing the casting from the refractory cast and resiliently pressing a thin steel liner into uniform contact with the said mold cavity to form the resin-contact surface of the mold.

6. The method of making precision molds for casting resinous bodies which comprises, forming a refractory cast of a mold pattern, mounting the cast in a cope box together with metallic tubular members, heating the refractory cast to temperatures sufficiently high to dehydrate the cast and while the cast is maintained at elevated temperatures casting an alloy consisting essentially of approximately 60% of aluminum, 20% of zinc, 13% of copper, and 7% of bismuth in contact with the refractory cast and around the tubular members, slowly cooling the unit, separating the casting and cold deforming a thin steel liner into intimate and uniform contact with the mold cavity to form the resin-contact surface of the mold.

7. The method of making precision molds for casting resinous bodies which comprises, casting an aluminous alloy consisting of approximately 60% aluminum, 20% of zinc, 13% of copper and 7% of bismuth in contact with a refractory plaster cast preheated to substantially the melting point of said alloy and subsequently cold deforming a ductile alloy steel liner, having a polished resin contact surface, into uniform contact with the mold cavity.

8. The method of making precision molds for casting resinous bodies which comprises, casting an aluminous alloy consisting of approximately 60% aluminum, 20% of zinc, 13% of copper and 7% of bismuth in contact with a refractory plaster cast preheated to substantially the melting point of said alloy and subsequently cold deforming a ductile alloy steel liner with the mold cavity and annealing the deformed liner.

9. The method of making precision molds for casting resinous bodies which comprises, casting an aluminous alloy consisting of approximately 60% of aluminum, 20% of zinc, 13% of copper and 7% of bismuth in contact with a refractory plaster cast and subsequently cold deforming a thin polished ductile steel liner into uniform contact with the mold cavity and then subjecting the deformed liner to a hydrogen anneal.

JOHN H. S. SKONING.

(References on following page)

REFERENCES CITED

The following references are of record in the file of this patent:

UNITED STATES PATENTS

| Number | Name | Date |
|---|---|---|
| 567,030 | Kelsey et al. | Sept. 1, 1896 |
| 630,771 | Blackwell, Jr. | Aug. 8, 1899 |
| 639,096 | Sagendorph | Dec. 12, 1899 |
| 1,362,594 | Berger et al. | Dec. 21, 1920 |
| 1,389,905 | Scavini | Sept. 6, 1921 |
| 1,776,145 | Bungay | Sept. 16, 1930 |
| 1,834,763 | Bonsieur | Dec. 1, 1931 |
| 1,834,899 | Grange | Dec. 1, 1931 |
| 1,914,037 | Norton et al. | June 13, 1933 |
| 1,985,341 | Fraser | Dec. 25, 1934 |
| 2,046,372 | Engstrom | July 7, 1936 |
| 2,211,133 | Krosta | May 21, 1936 |
| 2,224,337 | Bostwick | Dec. 10, 1940 |
| 2,277,374 | Spanel | Mar. 24, 1942 |
| 2,295,858 | McWane | Sept. 15, 1942 |
| 2,317,597 | Ford et al. | Apr. 27, 1943 |
| 2,336,578 | Skoning | Dec. 14, 1943 |

FOREIGN PATENTS

| Number | Country | Date |
|---|---|---|
| 561,710 | France | Aug. 14, 1923 |

OTHER REFERENCES

"Pickle Polished Stainless Steel," from "The Iron Age," Jan. 11, 1940, pp. 22-26.

Modern Plastics, June 1940, pp. 36, 37 and 94.

The Metallography and Heat Treatment of Iron and Steel, by A. Sauveur, McGraw-Hill, N. Y., 1938, page 218.